US008797309B2

(12) United States Patent
Ooishi

(10) Patent No.: US 8,797,309 B2
(45) Date of Patent: Aug. 5, 2014

(54) LIQUID CRYSTAL DISPLAY DEVICE

(75) Inventor: Yoshihisa Ooishi, Yokohama (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 466 days.

(21) Appl. No.: 12/849,124

(22) Filed: Aug. 3, 2010

(65) Prior Publication Data

US 2011/0025589 A1 Feb. 3, 2011

(30) Foreign Application Priority Data

Aug. 3, 2009 (JP) ................................ 2009-180883

(51) Int. Cl.
*G09G 3/36* (2006.01)
*G06F 5/00* (2006.01)

(52) U.S. Cl.
USPC .................. 345/208; 345/94; 345/92; 345/96

(58) Field of Classification Search
CPC ......... G09G 3/22; G09G 3/3208; G09G 3/30; G09G 3/3225; G09G 3/3233; G09G 3/3241; G09G 3/3266; G09G 3/3275; G09G 3/3258
USPC ................................. 345/204–215, 690–699
See application file for complete search history.

(56) References Cited

U.S. PATENT DOCUMENTS 5,091,784 A 2/1992 Someya et al.
5,568,163 A * 10/1996 Okumura ...................... 345/100
6,072,457 A * 6/2000 Hashimoto et al. ........... 345/100
6,552,706 B1 * 4/2003 Ikeda et al. ...................... 345/96
7,161,576 B2 * 1/2007 Kawabe et al. ................. 345/99
7,471,274 B2 * 12/2008 Kim ................................ 345/88
7,518,576 B1 * 4/2009 Rutherford ...................... 345/60
8,427,413 B2 * 4/2013 Kitayama et al. ............... 345/94
2008/0136806 A1 * 6/2008 Lee et al. ...................... 345/212
2008/0297458 A1 * 12/2008 Huang ............................ 345/96
2009/0040146 A1 * 2/2009 Takeuchi et al. ................ 345/63
2009/0102831 A1 * 4/2009 Hashimoto ................... 345/214
2009/0160879 A1 * 6/2009 Tu et al. ........................ 345/690
2009/0185082 A1 * 7/2009 Hashimoto ................... 348/739

(Continued)

FOREIGN PATENT DOCUMENTS

| | | |
|---|---|---|
| JP | 2-146629 | 12/1990 |
| JP | 07-072830 | 3/1995 |
| JP | 08-076086 | 3/1996 |
| JP | 2664780 | 6/1997 |

OTHER PUBLICATIONS

Japanese Official Action dated Apr. 2, 2013, for JP Application No. 2009-180883.

*Primary Examiner* — Kent Chang
*Assistant Examiner* — William Lu
(74) *Attorney, Agent, or Firm* — Antonelli, Terry, Stout & Kraus, LLP.

(57) ABSTRACT

A liquid crystal display device includes: a plurality of pixel circuits which is arranged in a matrix shape; a plurality of data lines; a selection unit which sequentially selects the plurality of pixel circuits for every group which is fewer in number than the number of rows of the pixel circuits; a control unit which sequentially changes the pixel circuits included in the groups; and a data signal supply unit which outputs a data signal to each data line. Each of the plurality of sequentially selected pixel circuits is connected to each of the different data lines.

12 Claims, 7 Drawing Sheets

(56) References Cited

U.S. PATENT DOCUMENTS

2009/0207117 A1* 8/2009 Chen et al. .................... 345/96
2010/0110114 A1* 5/2010 Hashimoto .................. 345/691
2010/0265410 A1* 10/2010 Sugihara et al. .............. 348/731
2010/0315402 A1* 12/2010 Hashimoto .................. 345/211

* cited by examiner

LIQUID CRYSTAL DISPLAY DEVICE

CROSS-REFERENCE TO RELATED APPLICATION

The present application claims priority from Japanese application JP 2009-180883 filed on Aug. 3, 2009, the content of which is hereby incorporated by reference into this application.

BACKGROUND OF THE INVENTION

1. Field of the Invention

The present invention relates to a liquid crystal display device, and more particularly, to a liquid crystal display device which selects a plurality of scanning lines at one time.

2. Description of the Related Art

In recent years, the number of frames per unit of time has been increased for the purpose of suppression of image persistence and for higher definition in a liquid crystal display device. For this reason, there is a tendency that a horizontal scanning period becomes short. In order to ensure time for writing data to each pixel circuit, a technology has been developed which simultaneously drives a plurality of rows of pixel circuits in one scanning line, and supplies data signals from different data lines to the respective rows of the simultaneously driven pixel circuits.

JP 2664780 B (corresponding to U.S. Pat. No. 5,091,784) and JP 07-72830 A (corresponding to U.S. Pat. No. 5,568,163) disclose a technology related to the present invention, and an example of a liquid crystal display device using an input of a video signal of an interlace type. In the liquid crystal display device, two scanning lines are selected, and the simultaneously selected scanning lines are shifted by one scanning line whenever displaying one frame. In addition, data is written from the same data line to the same column of pixel circuits among the pixel circuits connected to two simultaneously selected scanning lines.

SUMMARY OF THE INVENTION

Each of the pixel circuits of the liquid crystal display device includes a pixel electrode, a common electrode (which may be called a counter electrode), and a pixel switch. A storage capacitor is formed between the pixel electrode and the common electrode with liquid crystals interposed therebetween. The common electrode is electrically connected to the plurality of pixel circuits. In addition, a predetermined potential is supplied from a wiring connected to the common electrode and located on the outside of a display area.

A predetermined potential is supplied to the common electrode, but the potential of the common electrode may be temporally changed by a biased potential written to the plurality of pixel circuits. Hereinafter, this phenomenon is called a common variation. FIG. 9 is a diagram showing a case where the common variation is the strongest in the liquid crystal display device. The liquid crystal display device includes pixel circuits PC which are arranged in a matrix shape, scanning lines GL which are respectively connected to the corresponding rows of the pixel circuits, a first data line DL1 which is connected to the odd-number-th row of the pixel circuits PC, and a second data line DL2 which is connected to the even-number-th row of the pixel circuits PC. Hereinafter, the k-th scanning line GL is denoted by a scanning line GLk. Each of the pixel circuits PC includes a pixel electrode PX and a pixel switch TFT. One of a source electrode and a drain electrode of the pixel switch TFT is connected to the pixel electrode PX, and the other thereof is connected to the first data line DL1 or the second data line DL2. In addition, a gate electrode of the pixel switch TFT is connected to the scanning line GL.

In the liquid crystal display device shown in FIG. 9, a dot inversion driving method is used. In the dot inversion driving method, the polarities of the data signals written to the pixel circuits PC are different from each other in the adjacent pixel circuits PC. The symbols "+" and "−" marked in the pixel electrodes PX of FIG. 9 indicate the polarities of the data signals written to the pixel circuits PC of a certain frame. In addition, the data signal is supplied from the first data line DL1 or the second data line DL2.

The selection method of the pixel circuit using the selection of the scanning line GL will be described. First, the scanning line GL1 and the scanning line GL2 are simultaneously selected, and the pixel circuit PC connected to each of the scanning lines GL is selected. At this time, if the data signal having a large absolute value is only written to the pixel circuits PC of the positive polarity as shown in FIG. 9 via the data line DL1 or the data line DL2, the average potential of the data signals written to the pixel circuits PC becomes positive, and the average potential of the pixel electrode PX changes in the positive direction. Accordingly, the potential of the common electrode is temporarily deviated toward the positive side.

Next, the scanning line GL3 and the scanning line GL4 are simultaneously selected. At this time, if the data signal having a large absolute value is only written to the pixel circuits PC of the negative polarity as shown in FIG. 9, the average potential of the pixel electrodes PX changes in the negative direction. Thus the potential of the common electrode is temporarily deviated toward the negative side. In this case, the potential of the common electrode is unstably changed to the positive or negative side whenever the scanning line GL is selected. Then, a desired potential difference is not written to the storage capacitor provided between the pixel electrode and the common electrode, and the displayed gray level of the pixel become different from the desired gray level. Since the horizontal scanning period is short in recent years, this phenomenon has become more apparent.

The above-described phenomenon can be generated even in the liquid crystal display device for driving one row of the pixel circuits by selecting the scanning line GL once. However, the liquid crystal display device for driving two rows of the pixel circuits by selecting the scanning line GL once is more easily influenced by the phenomenon.

The present invention is contrived in consideration of the above-described problems, and an object of the present invention is to provide a liquid crystal display device capable of suppressing a deviation of gray level of a pixel caused by a biased potential written to a pixel circuit.

The typical aspects of the present invention disclosed in the present application will be simply described as below.

(1) According to an aspect of the present invention, there is provided a liquid crystal display device including: a plurality of pixel circuits which is arranged in a matrix shape; a plurality of data lines; a selection unit which sequentially selects the plurality of pixel circuits for every group which is fewer in number than the number of rows of the pixel circuits; a control unit which sequentially changes the pixel circuits included in the groups; and a data signal supply unit which outputs a data signal to each data line, wherein each of the plurality of sequentially selected pixel circuits is connected to each of the different data lines.

(2) In the liquid crystal display device according to (1), the control unit sequentially changes the pixel circuits included in the groups so as to overlap a part of the pixel circuits.

(3) In the liquid crystal display device according to (1) or (2), the liquid crystal display device further includes: a plurality of scanning lines which is arranged for each row of the pixel circuits and is connected to the selection unit and the pixel circuit of the row, wherein the selection unit sequentially selects the pixel circuits for every group of the plurality of pixel circuits connected to one or more continuous scanning lines.

(4) In the liquid crystal display device according to (3), polarity of a potential of the data signal supplied to the pixel circuits of a row is different from polarity of a potential of the data signal supplied to the pixel circuit of the adjacent row.

(5) In the liquid crystal display device according to (3) or (4), the control unit sequentially repeats an operation of changing each of the pixel circuits connected to the even-number-th scanning line, which are included in the group of the pixel circuits connected to two scanning lines from the first scanning line, to the next group and an operation of returning the changed pixel circuits to the original group.

(6) In the liquid crystal display device according to anyone of (1) to (5), the control unit repeats an operation of changing and returning the pixel circuits included in a group at intervals of selected frame number of frames; the data signal supply unit outputs the data signals having different polarities to the pixel circuits included in the group at intervals of inversion frame number of frames; and the selected frame number is different from the inversion frame number.

(7) In the liquid crystal display device according to (6), among the selection frame number and the inversion frame number, one of them is one and the other thereof is two.

According to the above-described aspect of the present invention, it is possible to suppress a deviation of gray level of the pixel caused by a biased potential written to the pixel circuit of the liquid crystal display device.

DETAILED DESCRIPTION OF THE INVENTION

Figure 1:
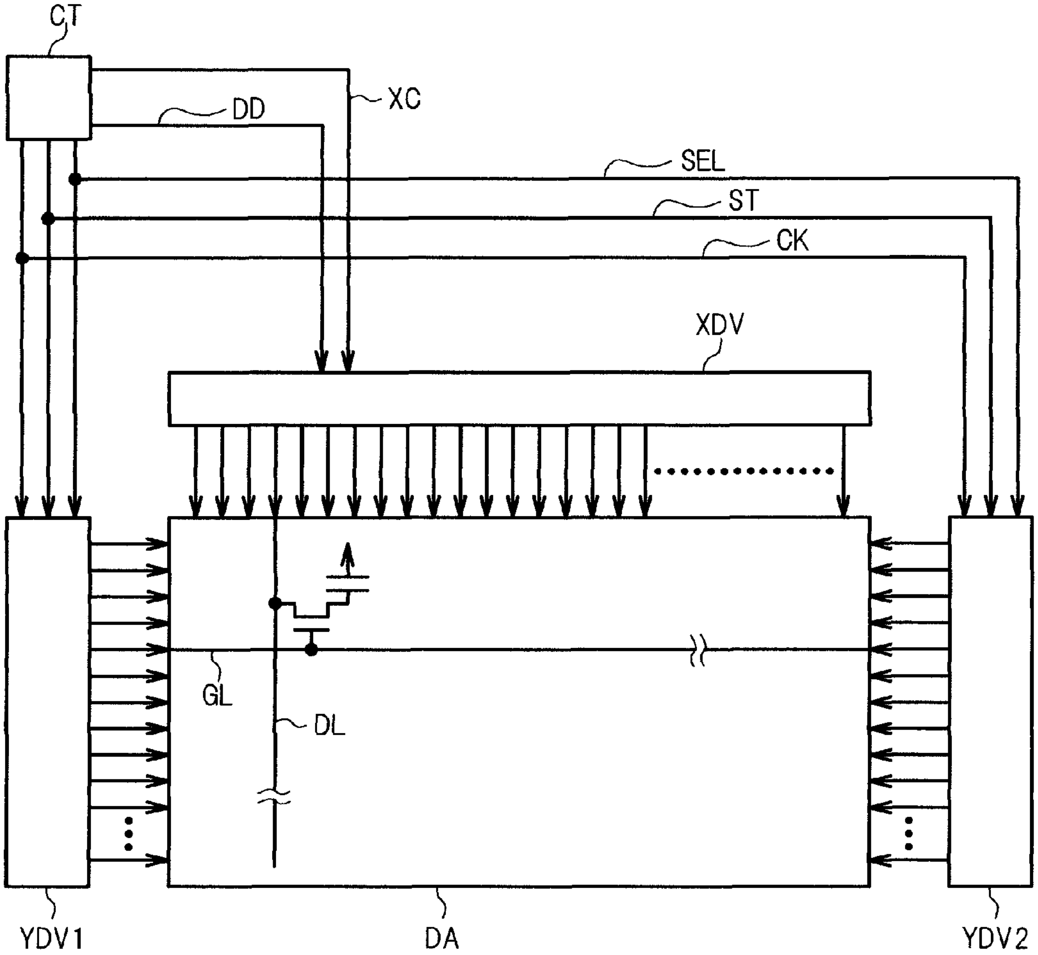
FIG. 1 is a diagram showing a configuration of a liquid crystal display device according to an embodiment of the present invention.

Hereinafter, an embodiment of the present invention will be described in detail with reference to the drawings. In the drawings, the same or equivalent elements will be denoted by the same reference characters, and redundant description thereof will be omitted. Hereinafter, an embodiment will be described in which the present invention is applied to a liquid crystal display device of an IPS (In-Plain Switching) type.

The liquid crystal display device includes a liquid crystal display panel. In the structure, the liquid crystal display panel includes an array substrate which has a pixel circuit PC and the like formed thereon, a counter substrate which is provided to be opposite to the array substrate, liquid crystals which are enclosed between the array substrate and the counter substrate, and a driver IC which is connected to the array substrate. In addition, a polarizing plate is attached to the outside of each of the array substrate and the counter substrate.

FIG. 1 is a diagram showing a configuration of a liquid crystal display device according to an embodiment of the present invention. The liquid crystal display device includes a display controller CT, a data line driving circuit XDV, a left scanning line driving circuit YDV1, a right scanning line driving circuit YDV2, a display area DA, a data line driving circuit control line XC, a display data transmission line DD, a selection signal line SEL, a start signal line ST, and a shift clock line CK. In the display area DA, a plurality of data lines DL is arranged in the longitudinal direction in FIG. 1, and a plurality of scanning lines GL is arranged in the transverse direction in FIG. 1 so as to intersect the plurality of data lines DL. Although only a part of the pixel circuits are shown in FIG. 1, the pixel circuits PC of 1920 columns×1080 rows are arranged in a matrix shape in the display area DA. Each pixel circuit PC is connected to the scanning line GL and the data line DL. The number of the data lines DL and the scanning lines GL is determined by the resolution of the liquid crystal display device. In the embodiment, the number of the data lines DL is 3840 of 1920×2, and the number of the scanning lines GL is 1080.

Here, the left scanning line driving circuit YDV1 supplies a signal from the left end of each of the scanning lines GL, and the right scanning line driving circuit YDV2 supplies a signal from the right end of each of the scanning lines GL. The two left and right scanning line driving circuits perform the same operation except for the positional relationship thereof, and both scanning line driving circuits constitute a scanning line driving circuit. The scanning line driving circuit serves as a selection unit which selects the pixel circuits PC connected to the scanning lines GL by supplying a potential of a high level (H) to each of the scanning lines GL. A data signal is written to each of the selected pixel circuits PC from the data line DL. In addition, hereinafter, an operation of supplying a potential of a high level (H) to the scanning line GL is referred to as the selection of the scanning line GL.

The data line driving circuit control line XC and the display data transmission line DD are lines connecting the display controller CT and the data line driving circuit XDV to each other. A data line driving circuit control signal is transmitted via the data line driving circuit control line XC, and display data is transmitted via the display data transmission line DD. The selection signal line SEL, the start signal line ST, and the shift clock line CK are lines connecting the display controller CT, the left scanning line driving circuit YDV1, and the right scanning line driving circuit YDV2 to each other. A selection signal is transmitted from the display controller CT via the selection signal line SEL, a start signal indicating the start timing for one frame is transmitted from the display controller CT via the start signal line ST, and a shift clock controlling switching timing or the like of the selected scanning line is transmitted from the display controller CT via the shift clock line CK.

Figure 2:
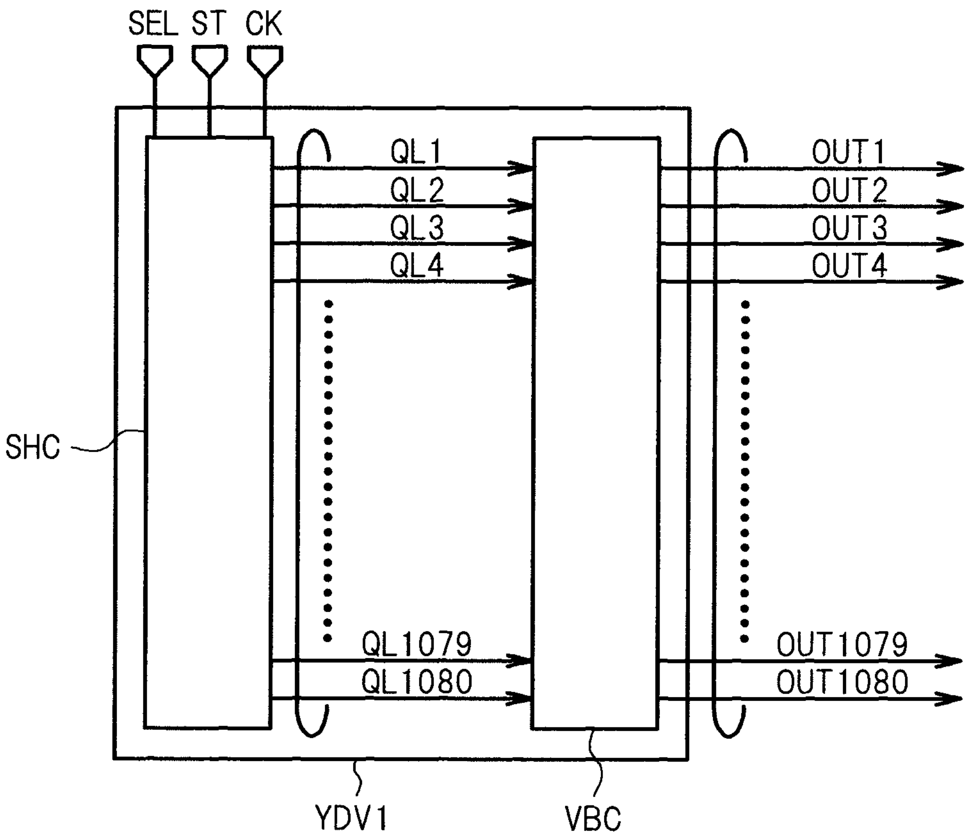
FIG. 2 is a diagram showing a configuration of a scanning line driving circuit.

FIG. 2 is a diagram showing a configuration of the scanning line driving circuit. In this drawing, the configuration of the left scanning line driving circuit YDV1 is shown, but the right scanning line driving circuit YDV2 has the same configuration.

The scanning line driving circuit includes a shift register circuit SHC and a booster circuit VBC. The shift register circuit SHC is connected to the selection signal line SEL, the start signal line ST, and the shift clock line CK extending from the display controller CT. The shift register circuit SHC and the booster circuit VBC are connected to each other via shift register output lines QLk (k is an integer from 1 to 1080). The shift register circuit SHC outputs a signal, which is used to select each of the scanning lines GL, to the shift register output lines QL.

The booster circuit VBC converts a voltage level of a signal input from the shift register output lines QLk into a driving voltage level for driving the scanning line GL within the display area DA, and outputs booster circuit output lines OUT1 TO OUT1080. The booster circuit output lines OUT1 TO OUT1080 are respectively supplied to the scanning lines GL1 TO GL1080. Here, the k-th scanning line GL is denoted by the scanning line GLk.

Figure 3:
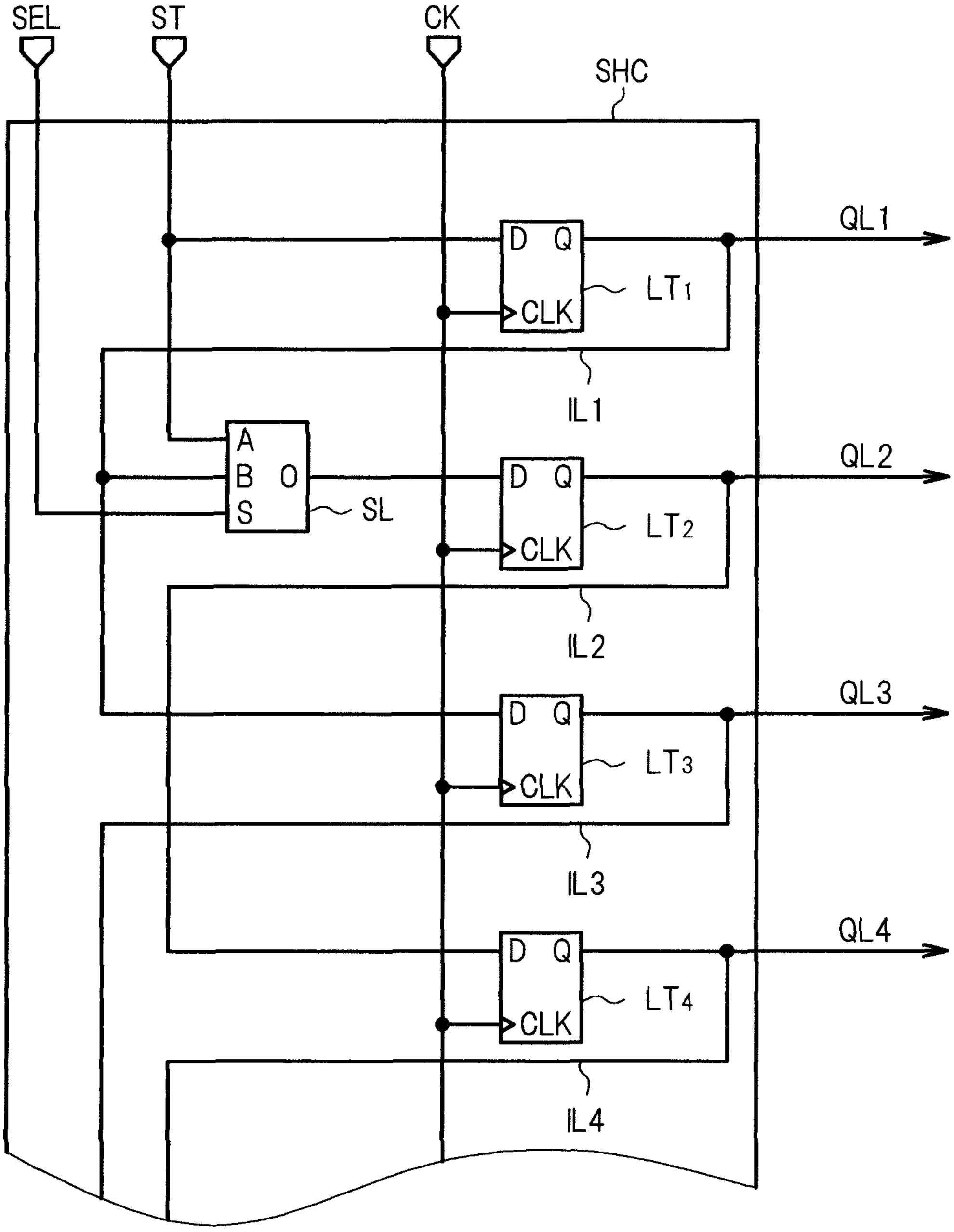
FIG. 3 is a diagram showing an equivalent circuit of a shift register circuit.

FIG. 3 is a diagram showing an equivalent circuit of the shift register circuit SHC. The shift register circuit SHC includes a selector circuit SL, a plurality of latch circuits $LT_1$ to $LT_{1080}$ each having an output terminal connected to a corresponding shift register output line QL, and a latch circuit connection line $IL_1$ connecting a data output Q of an l-th ($1 \le l \le 1078$) latch circuit $LT_1$ to a data input D of after the next latch circuit $LT_{1+2}$. The selector circuit SL includes an input terminal A, an input terminal B, a selection terminal S, and an output terminal O. The selector circuit SL connects the output terminal O to the input terminal A or the input terminal B in accordance with the signal input to the selection terminal S. When a signal of a high level is input to the selection terminal S, the signal input to the input terminal A is output to the output terminal O. When a signal of a low level is input to the selection terminal S, the signal input to the input terminal B is output to the output terminal O. The selection signal SEL is electrically connected to the selection terminal S of the selector circuit SL, and the start signal line ST is electrically connected to the input terminal A of the selector circuit SL and the data input D of the first latch circuit $LT_1$. The shift clock line CK is electrically connected to the clock inputs CLK of the latch circuits $LT_1$ to $LT_{1080}$. The output terminal O of the selector circuit SL is connected to the data input D of the second latch circuit $LT_2$. The latch circuit connection line $IL_1$ is also connected to the input terminal B of the selector circuit SL.

Figure 4:
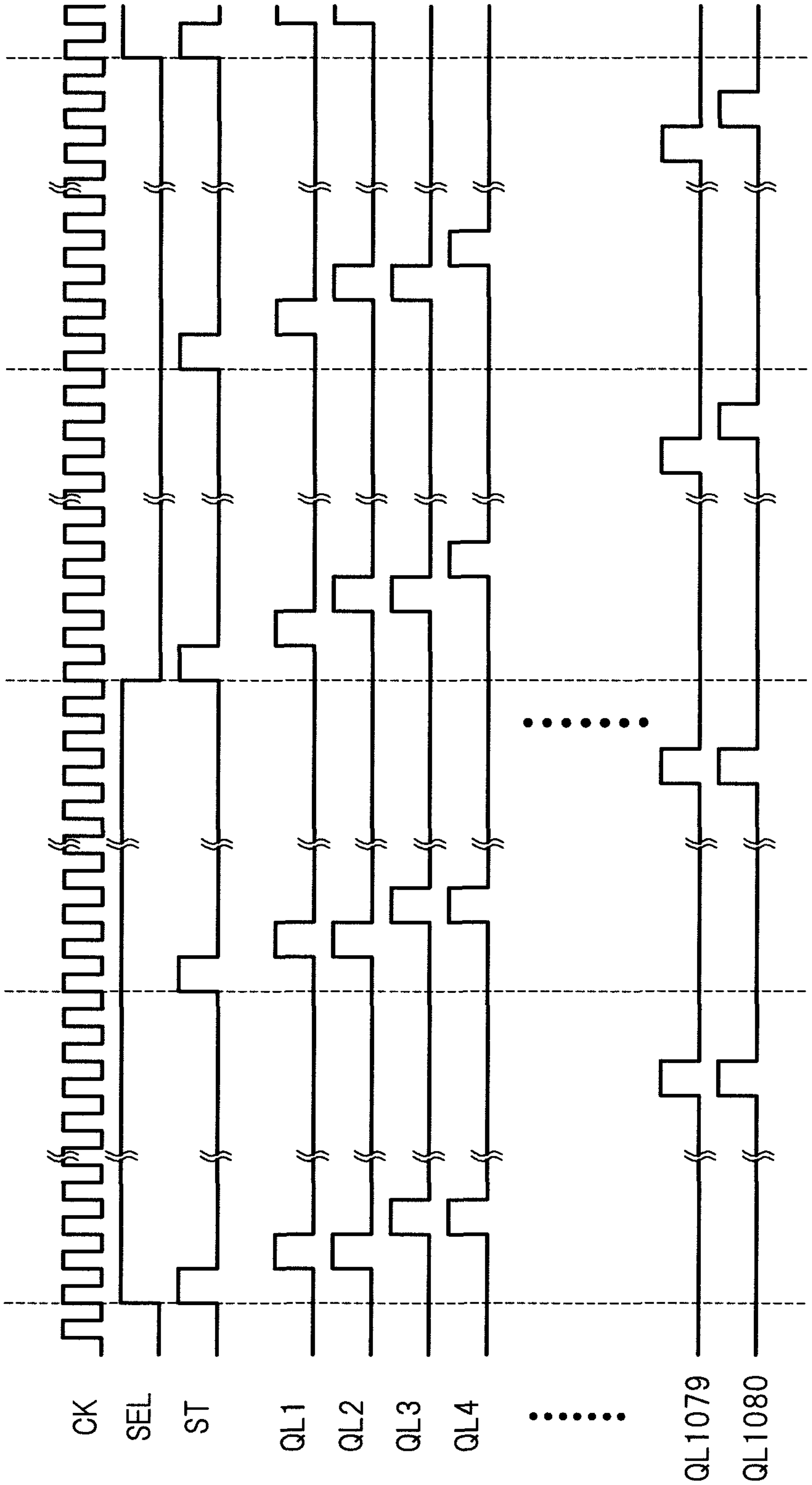
FIG. 4 is a waveform diagram showing an input/output signal of the shift register circuit when a selection method of a scanning line is changed every two frames.

With such a structure, it is possible to change the selection method of the scanning line GL by using the selection signal transmitted via the selection signal line SEL. The operation of the shift register circuit SHC will be described hereinafter. FIG. 4 is a waveform diagram showing an input/output signal of the shift register circuit SHC when the selection method of the scanning line GL is changed every two frames. In this drawing, waveforms of a shift clock supplied from the shift clock line CK, a selection signal supplied from the selection signal line SEL, a start signal supplied from the start signal line ST, and a potential of the shift register output lines QL1 to QL 1080 are shown in a sequential order from the upside. However, the description for the shift register output lines QL5 to QL1078 is omitted. The shift clock is periodically switched between potentials of a high level (H) and a low level (L), and this period corresponds to a horizontal scanning period.

First, the potentials of the selection signal line SEL and the start signal line ST become H at the timing at which the shift clock becomes H. Since the potential of the selection signal line SEL is H, the start signal is input to the data input D of the first latch circuit $LT_1$ and the data input D of the second latch circuit $LT_2$ connected to the output terminal O of the selector circuit SL. Next, when the potential of the shift clock becomes L and again becomes H at the next horizontal scanning period, a pulse for changing the potential to H is output to two shift register output lines QL1 and QL2 for one horizontal scanning period. The potential of the start signal line ST is L at this timing. Then, the potential of H of the data output Q of the latch circuit $LT_1$ and the potential of H of the data output Q of the latch circuit $LT_2$ are respectively input to the data inputs D of the latch circuits $LT_3$ and $LT_4$. In this way, the potential of H is sequentially output to each of the two shift register output lines QL whenever the horizontal scanning period elapses. Then, after the potential of H is output to the shift register output line QL1079 and the shift register output line QL1080, the start signal line ST becomes H through a predetermined period, and becomes L after one horizontal scanning period. Here, the length of the period until the potential of the start signal becomes H after the potential of the start signal line ST becomes H corresponds to the length of the display period of one frame of the liquid crystal display device. In addition, the scanning of the second frame is sequentially started from the shift register output lines QL1 and QL2. More specifically, the potential of H is sequentially output from the shift register output lines QL1 and QL2 in the same way as the first frame.

After the potential of H is output from the shift register output line QL1080 in the second frame, the potential of the selection signal line SEL becomes L, and the potential of the start signal line ST becomes H. Since the potential of the selection signal line SEL is L, the start signal is input to the data input D of the first latch circuit $LT_1$, but is not input to the data input D of the second latch circuit $LT_2$. For this reason, the potential of H is output to only the shift register output line QL1 at the next horizontal scanning period. Then, the data output Q of the latch circuit $LT_1$ is input to the data inputs D of the second latch circuit $LT_2$ and the third latch circuit $LT_3$. Accordingly, the potential of H is output to the shift register output lines QL2 and QL3 at the next horizontal scanning period. Then, the potential of H is sequentially output to each of the two shift register output line QL whenever the horizontal scanning period elapses. Here, these operations are also repeated in the next frame period. In addition, after the shift register output lines QL are scanned until the fourth frame, the same operation as the first frame is repeated again.

The signal output to the shift register output line QL is converted into the driving voltage level supplied to the scanning line GL by the booster circuit VBC. The converted signal is supplied to the scanning line GL via the booster circuit output OUT. Accordingly, also in the scanning line GL, each of the two scanning lines GL are selected from the first scanning line GL1 in the first and second frames. Then, each of the two scanning lines GL are selected from the second scanning line GL2 in the third and fourth frames after the first scanning line GL1 is selected. In the scanning line driving circuit, the selection method of the scanning line GL is changed by the selection signal from the selection signal line SEL. From another angle, it is considered that the display controller CT has a function of changing the selection method of the scanning line GL by changing the selection signal output to the selection signal line SEL.

Figure 5:
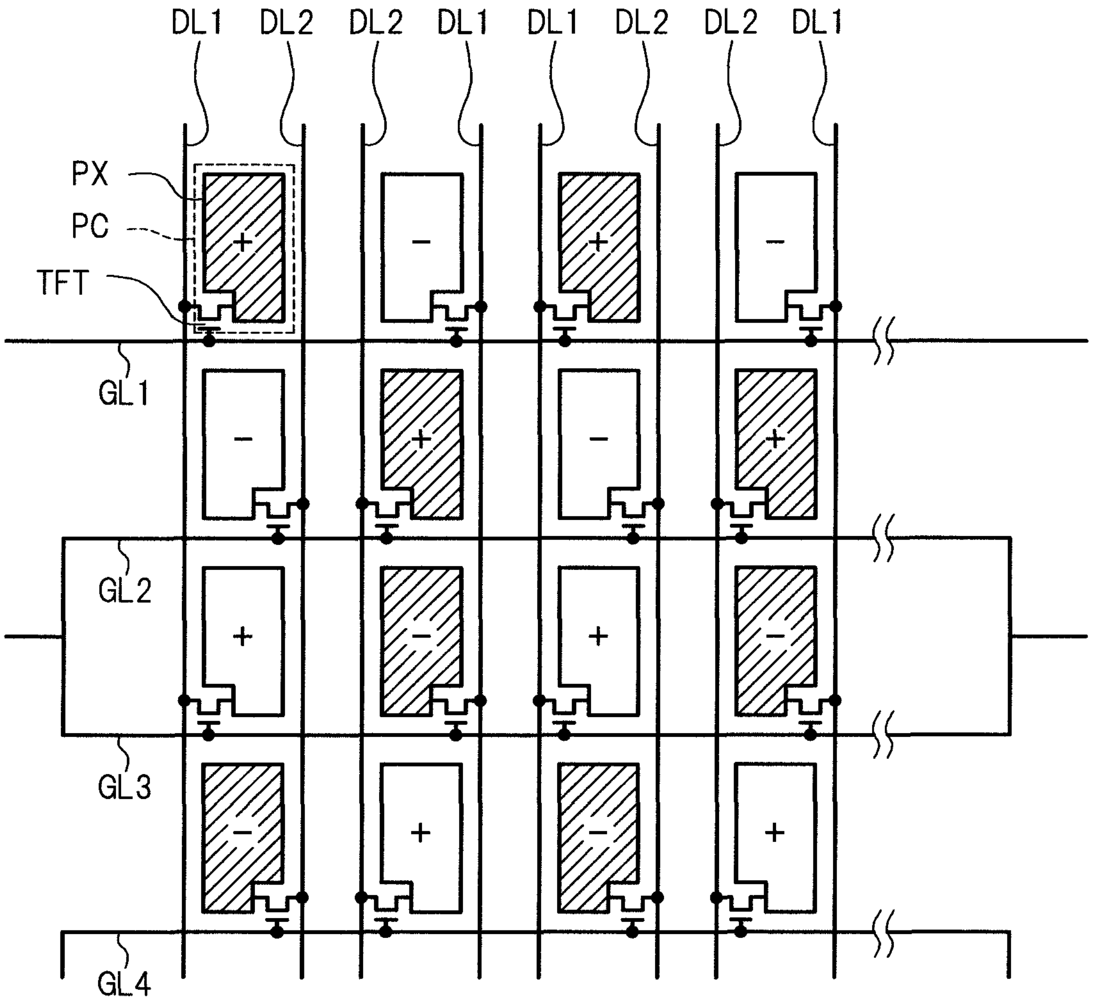
FIG. 5 is a diagram showing an equivalent circuit when a scanning line is selected by different selection methods.
Figure 9:
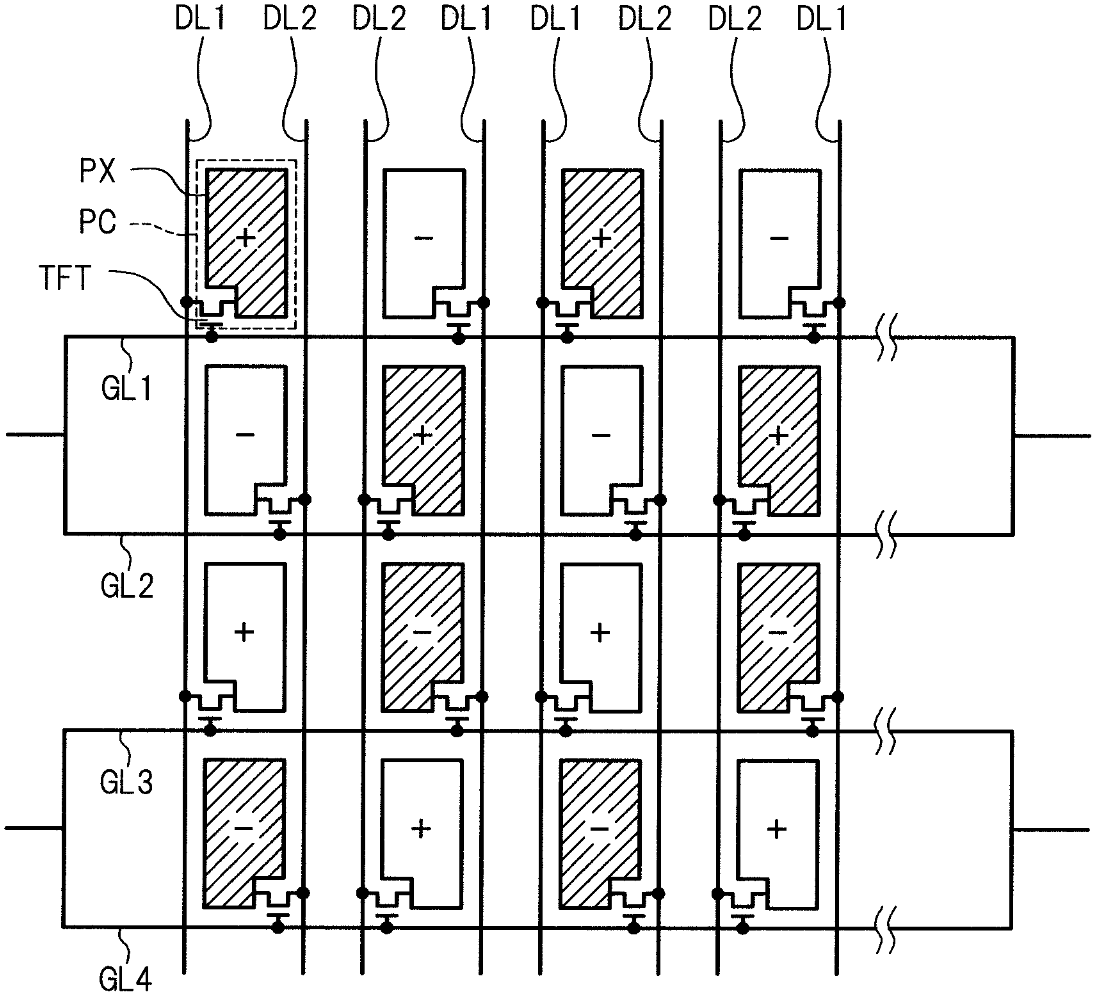
FIG. 9 is a diagram showing a case where a common variation is the strongest in a liquid crystal display device.

The relationship between the scanned scanning line GL and the pixel circuit PC will be described. FIG. 5 is a diagram showing an equivalent circuit when the scanning lien GL is selected in a selection method different from that of FIG. 9. This drawing is a diagram showing the state in the third frame. Here, FIG. 9 corresponds to the state of the first frame. In FIGS. 5 and 9, the configuration of the pixel circuits PC arranged in a part of the display area DA and the scanning line GL and the data line DL connected thereto is shown.

In FIGS. 5 and 9, there are shown the pixel circuits PC arranged in a matrix shape within the display area DA, the scanning lines GL respectively connected to pixel circuits PC of the corresponding rows, the first data lines DL1 connected to the pixel circuits PC of the odd-number-th row, and the second data lines DL2 connected to the pixel circuits PC of the even-number-th row. Each of the pixel circuits PC includes a pixel electrode PX and a pixel switch TFT. One of source electrode and drain electrode of the pixel switch TFT is connected to the pixel electrode PX, and the other thereof is connected to the first or second data line. In addition, a gate electrode of the pixel switch TFT is connected to the scanning line GL. In addition, a common electrode (not shown) is provided so as to be opposite to each pixel electrode PX. The common electrode is connected to the wiring other than the display area, and a predetermined potential is supplied to the wiring.

In the example of FIG. 9, each of the two scanning lines are sequentially selected from the scanning line GL1. In accordance with the selection, there is shown a wiring which is provided between the scanning lines GL1 and GL2 and between the scanning lines GL3 and GL4 so as to connect them each other in FIG. 9. In the example of FIG. 5, after the scanning line GL1 is scanned, each of the two scanning lines are sequentially scanned from the scanning line GL2. In accordance with the selection, there is shown a wiring which is provided between the scanning lines GL2 and GL3 so as to connect them each other in FIG. 5.

The display controller CT sequentially changes the selection method (first selection method) of the scanning line GL shown in FIG. 9 or the selection method (second selection method) of the scanning line GL shown in FIG. 5 for every certain number (selected frame number) of the displayed frames in accordance with the selection signal. When focusing on the change of the selection method of the pixel circuit PC, in the first selection method, the pixel circuits PC within the display area DA are divided into groups connected to each of the two scanning lines GL sequentially continuous from the first scanning line, and each group is sequentially selected. In the second selection method, the pixel circuits PC within the display area DA are divided into a group connected to the first scanning line GL, 539 groups connected to each of the two scanning lines GL sequentially continuous from the second scanning line, and a group connected to the 1080-th scanning line GL, and each group is sequentially selected. It is considered that the pixel circuits as the members of the groups are changed between the groups of the first and second selection methods. Specifically, when the groups of FIG. 9 are sequentially numbered downward from the top of the drawing, in the pixel circuits PC connected to the even-number-th scanning lines GL of each group of the first selection method, the pixel circuits PC as the members of the group are changed so as to be included in the next number of a group in the second selection method. In addition, subsequently, the members of the groups of the second selection method are returned to the members of the groups of the first selection method. The display controller repeats the change operation and the return operation. Likewise, when the groups of the simultaneously selected pixel circuits PC are sequentially changed whenever displaying a certain frame number of frames, it is possible to suppress a deviation of gray level caused by a biased potential written to each pixel circuit PC. This will be described in detail below.

Figure 6:
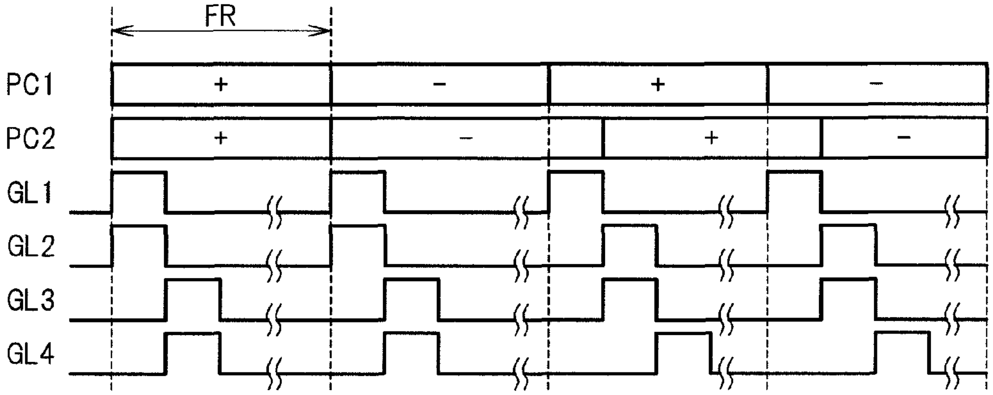
FIG. 6 is a diagram showing variation in polarity of a voltage applied to a liquid crystal and a waveform of a potential of a scanning line when a selection method of a scanning line is changed every two frames and two-frame inversion.

FIG. 6 is a diagram showing variation in polarity of a voltage applied to liquid crystals and a waveform of a potential of the scanning line GL in the method of changing the selection method of the scanning line GL in each of the two frames and two-frame inversion. Here, the frame inversion indicates that the data line driving circuit XDV inverts polarity of a potential applied to each of the pixel circuits PC via the data line whenever a certain number of frames are displayed. Here, "two" of the two frame inversion indicates a frame inversion period. In the case of the two-frame inversion, the data line driving circuit XDV inverts the polarity whenever displaying one frame. The frame inversion prevents a phenomenon in which the characteristics are degraded when a potential of the same polarity is continuously applied to the liquid crystals of each of the pixel circuits PC. FIG. 6 shows variation over time of polarity of a potential applied to the pixel electrode PX of the pixel circuits PC of a certain column of the first row, variation over time of polarity of a potential applied to the pixel electrode PX of the pixel circuits PC of a certain column of the second row, and a waveform of a potential applied to the scanning lines GL1 to GL4 from the first to fourth rows. Here, the period from selecting the scanning line GL1 until the next scanning line GL1 is selected is the frame period FR. In addition, in the embodiment, since a dot inversion driving method is used, even in the pixel circuit PC of the first row, the polarity of the potential may be opposite to that of FIG. 6. The same applies to the rows from the second row. In this drawing, it is understood that the polarity of the potential written to each of the pixel circuits is inverted in each single frame.

Next, variation in common electrode of each frame of FIG. 6 will be described with reference to the example of FIG. 9. The example of FIG. 9 is an example in the case where an influence of the common variation is the strongest. FIG. 9 corresponds to the state of the first frame. The symbols "+" and "−" marked in each of the pixel electrodes PX of FIG. 9 indicate the polarity of the data signal written to each of the pixel circuits PC via the first data line DL1 or the second data line DL2, and the data signal having a large absolute value is written to the pixel electrode PX depicted by the oblique line. This corresponds to the case where a check pattern is turned on by setting the pixels of two rows×one column as one block. When the scanning lines GL1 and GL2 are simultaneously selected, in the group of the selected pixel circuits PC, the data signal having the larger absolute value is written to the pixel circuit PC in which the polarity of the written data signal is positive. Accordingly, the average potential of the pixel electrode PX changes in the positive direction. Therefore, the potential of the common electrode temporally deviates toward the positive side. Next, when the scanning lines GL3 and GL4 are simultaneously selected, in the group of the selected pixel circuits PC, the data signal having the larger absolute value is written to the pixel circuit PC in which the polarity of the written data signal is negative. Accordingly, the average potential of the pixel electrode PX changes in the negative direction. Therefore, the potential of the common electrode temporally deviates toward the negative side. When this is repeated, the potential of the common electrode repeatedly changes between the positive side and the negative side. That is, the same common variation as in the related art occurs. In the second frame, the polarity is inverted by the frame inversion, but the potential of the common electrode changes between the positive side and the negative side in the same way as described above.

The state of the third frame corresponds to FIG. 5. In the case where the scanning line GL1 is selected, the average potential of the pixel electrode PX changes in the positive direction, but since there is only the pixel circuit PC corresponding to one row, the variation amount is a half of that of the first frame. Next, in the case where the scanning lines GL2 and GL3 are selected, in the group of the selected pixel circuits PC, since the number of "+" and "−" of the pixel circuits PC to which the data signal having a large absolute value is written is the same, the average potential of the pixel electrodes PX is removed, and the variation is suppressed compared with the first frame or the second frame. Accordingly, the common variation becomes smaller. Even in the fourth frame, the polarity is inverted, but the average potential of the pixel electrodes PX is removed in the same way. Accordingly, the common variation also becomes smaller. Subsequently, the first to fourth frames are repeated.

Accordingly, even in the worst example described herein, since the influence of the common variation is suppressed in the half frame, the influence of the common variation is suppressed as a whole. This is because there is an advantage of averaging the influence caused by the biased potential written to the pixel circuit PC by changing the group of the pixel circuits PC, that is, the combination of the pixel circuits PC simultaneously selected as a group. Accordingly, the average is not limited in the case where the worst pattern is displayed.

In addition, in the case where the number of frames changed in the frame inversion is set to one, and the number of frames changed in the selection method is set to two, the advantage thereof will be described. According to FIG. 6, in the pixel circuit PC of a certain column of the first row, the potential applied by the data signal when selecting the scanning line GL1 in the first frame is maintained until the scanning line GL1 is applied in the second frame. Here, in the even-number-th scanning line GL, when the selection method is changed from the first selection method to the second selection method, the selected timing is delayed by one horizontal scanning period. Then, when the selection method is changed from the second selection method to the first selection method, the selected timing is advanced by one horizontal scanning period. Accordingly, in the pixel circuit PC connected to the even-number-th scanning line GL, the period of applying the potential of the second frame to the liquid crystals becomes long, and the period of maintaining the potential applied to the fourth frame becomes shorter. However, one polarity is applied in the first frame and the third frame, and the other polarity is applied in the second and fourth frames. Accordingly, the period of applying one polarity is equal to the period of applying the other polarity. Therefore, it is possible to prevent the potential applied to the liquid crystals from being biased in accordance with the change of the selection method of the scanning line GL.

Figure 7:
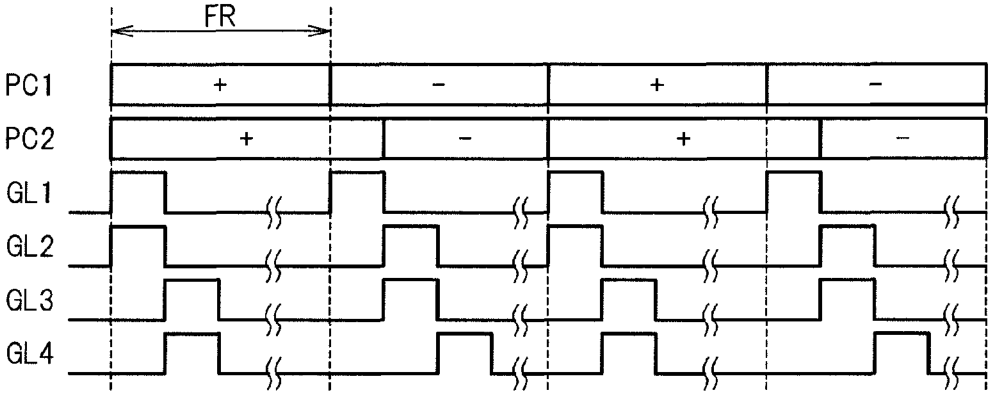
FIG. 7 is a diagram showing variation in polarity of a voltage applied to a liquid crystal and a waveform of a potential of a scanning line when a selection method of a scanning line is changed every one frame and two-frame inversion.

The above-describe advantage is more apparent compared with the case where the number of frames of changing the frame inversion is set to 1 and the number of frames of changing the selection method is set to 1. FIG. 7 is a diagram showing variation in polarity of a voltage applied to the liquid crystals and a waveform of a potential of the scanning line GL in the case where the selection method of the scanning line GL is changed in each single frame and two-frame inversion. The items shown in FIG. 7 are the same as those of FIG. 6. When focusing on the pixel circuit PC of a certain column of the second row among the pixel circuits PC connected to the even-number-th scanning line GL, the period of applying the potential written to the odd-number-th frame to the liquid crystals becomes longer, and the period of maintaining the potential applied to the even-number-th frame becomes shorter. Since the polarity of the potential applied to the pixel circuit PC changes in accordance with the same period, the period of applying the potential of one polarity becomes longer, and the characteristics of the liquid crystal are degraded.

Figure 8:
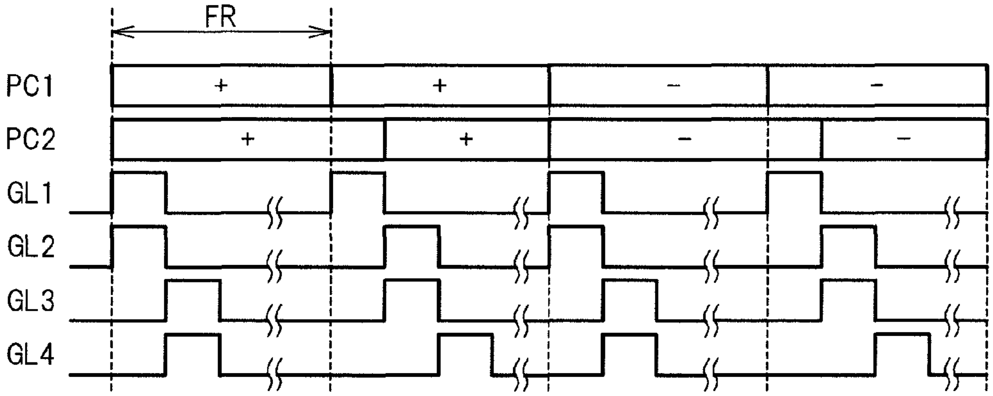
FIG. 8 is a diagram showing variation in polarity of a voltage applied to a liquid crystal and a waveform of a potential of a scanning line when a selection method of a scanning line is changed every one frame and four-frame inversion.

In addition, in order to prevent the potential applied to the liquid crystals from being biased, the number of frames where the frame inversion is changed may be different from the number of frames where the selection method is changed. For example, the number of frames where the frame inversion is changed may be set to two, and the number of frames where the selection method is changed may be set to one. FIG. 8 is a diagram showing variation in polarity of a voltage applied to the liquid crystals and a waveform of a potential of the scanning line in the case where the selection method of the scanning line is changed in each single frame and four-frame inversion. In this case, the period of applying the potential written to the first and third frames to the liquid crystals becomes longer, and the period of maintaining the potential applied to the second and fourth frames becomes shorter. On the other hand, the polarities of the potentials applied in the first and second frames and in the third and fourth frames are the same. As a result, the period of applying one polarity is equal to the period of applying the other polarity, and the same advantage is obtained.

While there have been described what are at present considered to be certain embodiments of the invention, it will be understood that various modifications may be made thereto, and it is intended that the appended claims cover all such modifications as fall within the true spirit and scope of the invention.

For example, the present invention may be applied to a liquid crystal display device of a VA (Vertically Aligned) type, a TN (Twisted Nematic) type, or the like. It is only difference in that the electrodes constituting the storage capacitors together with the pixel electrodes are disposed on the array substrate or the counter substrate. However, the problem caused by the common variation with the variation in potential of the pixel electrode is the same, and the configuration of the scanning line or the pixel circuit is the same.

In addition, in the above-described embodiment, there are two methods for selecting the scanning lines, but may be three or more and the methods may be sequentially changed. Since it is necessary only to have different types of methods for selecting the pixel circuits, the methods are not limited to two types. For the same reason, the number of scanning lines selected at the same time may be three or more.

What is claimed is:

1. A liquid crystal display device comprising:

a plurality of pixel circuits which are arranged in a matrix;

a plurality of data lines;

a selection unit which sequentially selects groups of the pixels circuits, wherein the groups respectively contain either one row of the pixel circuits or adjacent rows of the pixel circuits;

a control unit which sequentially changes a selection state of the groups of the pixel circuits between a first selection state and a second selection state every selected frame number;

wherein in the first selection state, the pixel circuits are divided into groups connected to each of two scanning lines sequentially continuous from the first scanning line, and each group is sequentially selected;

wherein in the second selection state, the pixel circuits are divided into a group connected to the first scanning line and the remaining groups connected to each of two scanning lines sequentially continuous from the second scanning line, and a group and the remaining groups sequentially selected;

a data signal supply unit which outputs a data signal to each data line, and inverts polarity of a potential applied to each of the pixel circuits via the data line every inversion frame number;

wherein the pixel circuits included in the groups are connected to each of the different data lines; and wherein the number of the selected frame number is different from the number of the inversion frame number.

2. The liquid crystal display device according to claim 1, wherein the control unit sequentially changes the pixel circuits included in corresponding one of the groups every one or more frames so as to overlap a part of the pixel circuits.

3. The liquid crystal display device according to claim 1, wherein the scanning lines are connected to the selection unit and the pixel circuit of the row, wherein the selection unit sequentially selects the pixel circuits for every group of the plurality of pixel circuits connected to one or more continuous scanning lines.

4. The liquid crystal display device according to claim 3, wherein polarity of a potential of the data signal supplied to the pixel circuits of a column is different from polarity of a potential of the data signal supplied to the pixel circuit of the adjacent column.

5. The liquid crystal display device according to claim 3, wherein the control unit repeats switching between the first and second selection states every one or more frames, wherein, in the first selection state, each of the groups includes an odd row and an even row of the pixel circuits, starting with the first odd row, and in the second selection state, a first group contains only the first odd row of the pixel circuits, a last group contains only the last even row of the pixel circuits, and each group between the first group and the last group includes an even row and an adjacent odd row of the pixel circuits.

6. The liquid crystal display device according to claim 1, wherein one of the number of the selection frame number and the number of the inversion frame number, is one and the other number is two.

7. A liquid crystal display device comprising:

a plurality of pixel circuits which are arranged in a matrix;

a plurality of data lines;

a selection unit which sequentially selects groups of the pixels circuits, wherein the groups respectively contain either one row of the pixel circuits or adjacent rows of the pixel circuits;

a control unit which sequentially changes a selection state of the groups of the pixel circuits between a first selection state and a second selection state every selected frame number;

wherein in the first selection state, the pixel circuits are divided into groups connected to each of N scanning lines sequentially continuous from the first scanning lines, and each group is sequentially selected, where N is at least 3;

wherein in the second selection state, the pixel circuits are divided into a group connected to the first scanning line and the remaining groups connected to each of N scanning lines sequentially continuous from the second scanning line, and a group and the remaining groups sequentially selected;

a data signal supply unit which outputs a data signal to each data line, and inverts polarity of a potential applied to each of the pixel circuits via the data line every inversion frame number;

wherein the pixel circuits included in the groups are connected to each of the different data lines; and wherein the number of the selected frame number is different from the number of the inversion frame number.

8. The liquid crystal display device according to claim 7, wherein the control unit sequentially changes the pixel circuits included in corresponding one of the groups every one or more frames so as to overlap a part of the pixel circuits.

9. The liquid crystal display device according to claim 7, wherein the scanning lines are connected to the selection unit and the pixel circuit of the row, wherein the selection unit sequentially selects the pixel circuits for every group of the plurality of pixel circuits connected to one or more continuous scanning lines.

10. The liquid crystal display device according to claim 9, wherein polarity of a potential of the data signal supplied to the pixel circuits of a column is different from polarity of a potential of the data signal supplied to the pixel circuit of the adjacent column.

11. The liquid crystal display device according to claim 9, wherein the control unit repeats switching between the first and second states every one or more frames, wherein, in the first selection state, each of the groups includes an odd row and an even row of the pixel circuits, starting with the first odd row, and, in the second selection state, a first group contains only the first odd row of the pixel circuits, a last group contains only the last even row of the pixel circuits, and each group between the first group and the last group includes an even row and an adjacent odd row of the pixel circuits.

12. The liquid crystal display device according to claim claim 7, wherein one of the number of the selection frame number and the number of the inversion frame number, is one and the other number is two.

* * * * *